US009625786B2

(12) United States Patent
Rijken et al.

(10) Patent No.: US 9,625,786 B2
(45) Date of Patent: Apr. 18, 2017

(54) LINEAR ACTUATOR AND CAMERA WITH A MOTORIZED BACK FOCUS MODULE WITH THE LINEAR ACTUATOR

(75) Inventors: Antonius Maria Rijken, Nuenen (NL); Bastiaan Rothengatter, Rotterdam (NL)

(73) Assignee: Robert Bosch GmbH, Stuttgart (DE)

( * ) Notice: Subject to any disclaimer, the term of this patent is extended or adjusted under 35 U.S.C. 154(b) by 425 days.

(21) Appl. No.: 14/235,917

(22) PCT Filed: Jul. 29, 2011

(86) PCT No.: PCT/EP2011/063159
§ 371 (c)(1),
(2), (4) Date: Apr. 28, 2014

(87) PCT Pub. No.: WO2013/017152
PCT Pub. Date: Feb. 7, 2013

(65) Prior Publication Data
US 2014/0293121 A1    Oct. 2, 2014

(51) Int. Cl.
*G03B 13/00* (2006.01)
*G03B 13/34* (2006.01)
(Continued)

(52) U.S. Cl.
CPC .......... *G03B 13/34* (2013.01); *F16H 25/08* (2013.01); *G03B 3/04* (2013.01); *G03B 17/02* (2013.01); *G03B 19/00* (2013.01); *H04N 5/2254* (2013.01); *H04N 5/23296* (2013.01); *Y10T 74/18568* (2015.01)

(58) Field of Classification Search
None
See application file for complete search history.

(56) References Cited

U.S. PATENT DOCUMENTS 4,959,672 A * 9/1990 Yoshino ............... G03B 17/425
242/349
5,530,502 A * 6/1996 Petruchik ............. G03B 17/425
396/411
(Continued)

FOREIGN PATENT DOCUMENTS

CN    101292194    10/2008
CN    201403143    2/2010
(Continued)

OTHER PUBLICATIONS

International Search Report for Application No. PCT/EP2011/063159 dated Sep. 23, 2011 (3 pages).

*Primary Examiner* — Twyler Haskins
*Assistant Examiner* — Wesley Chiu
(74) *Attorney, Agent, or Firm* — Michael Best & Friedrich LLP (57) ABSTRACT

Surveillance networks are used to observe large areas, like public places, streets, public buildings or private houses, privates premises etc. The surveillance networks often comprise a plurality of surveillance cameras. Such surveillance cameras should be small, robust, trouble-free and have low-maintenance requirements. Subject-matter of the invention is a linear actuator (8) for a linear motion of a component of a camera (1), the linear actuator comprising a supporting structure (6), a motor (10) arranged on the supporting structure for generating a rotational movement, a component carrier (7) for carrying the component and for performing the linear motion relative to the supporting structure, a gear mechanism (11) for transmitting the rotational movement, whereby the last gear of the gear mechanism before the component carrier is a transfer gear (20), whereby the transfer gear comprises a guide way (23*a, b, c*) extending in rotational direction of the transfer gear with a slope along the guide way whereby the component carrier is
(Continued)

coupled with the guide way by resting means (24*a, b, c*), so that the component carrier is displaced in the linear direction (9) by a rotational movement of the transfer gear due to the slope of the guide way.

18 Claims, 6 Drawing Sheets

(51) Int. Cl.
    *H04N 5/225*     (2006.01)
    *G03B 3/04*     (2006.01)
    *G03B 17/02*     (2006.01)
    *G03B 19/00*     (2006.01)
    *F16H 25/08*     (2006.01)
    *H04N 5/232*     (2006.01)

(56) References Cited

U.S. PATENT DOCUMENTS

| | | | | |
|---|---|---|---|---|
| 5,930,544 A | * | 7/1999 | Tseng | H04N 5/2259 348/374 |
| 5,950,021 A | * | 9/1999 | Suzuki | G02B 7/10 396/75 |
| 6,170,999 B1 | * | 1/2001 | Okuno | G03B 17/425 396/413 |
| 2004/0233303 A1 | | 11/2004 | Okutani et al. | |
| 2006/0023107 A1 | * | 2/2006 | Bolken | G03B 13/02 348/335 |
| 2008/0174690 A1 | * | 7/2008 | Chang | G02B 7/102 348/345 |
| 2009/0303379 A1 | * | 12/2009 | Wada | G03B 3/04 348/373 |
| 2009/0323208 A1 | * | 12/2009 | Kurosawa | G03B 19/12 359/824 |
| 2012/0075519 A1 | * | 3/2012 | Blasch | G02B 7/102 348/340 |
| 2014/0267892 A1 | * | 9/2014 | Rijken | G03B 3/04 348/373 |

FOREIGN PATENT DOCUMENTS

| | | |
|---|---|---|
| DE | 102007001649 | 7/2008 |
| EP | 1777566 | 4/2007 |

\* cited by examiner

LINEAR ACTUATOR AND CAMERA WITH A MOTORIZED BACK FOCUS MODULE WITH THE LINEAR ACTUATOR

STATE OF THE ART

The invention relates to a linear actuator and a camera with a motorized back focus module with the linear actuator. More specifically, the invention relates to a linear actuator for a linear motion of a component, especially an image capturing unit, of a camera, whereby the linear actuator comprises a supporting structure, a motor arranged on the supporting structure for generating a rotational movement, a component carrier for carrying the component and for performing the linear motion relative to the supporting structure, and a gear mechanism for transmitting the rotational movement, whereby the last gear of the gear mechanism before the component carrier is a transfer gear as well as a camera with a motorized back focus module, whereby the motorized back focus module comprises the linear actuator for adjusting the back focus.

Surveillance networks are used to observe large areas, like public places, streets, public buildings or private houses, privates premises etc. The surveillance networks often comprise a plurality of surveillance cameras, which are distributed in the surveillance area, and a surveillance control center, whereby the cameras are connected with the surveillance control center by a public or private network, so that images, captured by the cameras, can be transferred to the surveillance control center. Such surveillance cameras should be small, robust, trouble-free and have low-maintenance requirements.

A respective camera system or surveillance network is for example disclosed in the document DE 10 2007 001 649 A1.

DISCLOSURE OF THE INVENTION

The invention relates to a linear actuator with the features of claim 1 and to a camera with the features of claim 11. Preferred or advantageous embodiments of the invention are disclosed by the dependent claims, the description and the figures.

Subject matter of the invention is thus the linear actuator, which is adapted to move or displace a component of a camera in a linear direction. Further possible features of the camera will be described in connection with the independent claim 11. The component is especially an image capturing unit, for example a CCD- or a CMOS-chip. Preferably, the linear direction is parallel or identical to the viewing direction of the camera and/or to the optical axis of the camera and/or perpendicular to the surface extension of an image sensor in the image capturing device.

The linear actuator comprises a supporting structure, which is for example made of plastic and may be molded, especially injection molded. The supporting structure defines a basis for other parts of the linear actuator. Preferably, the supporting structure is arranged stationary or fixed in or on the camera.

Attached or coupled to the supporting structure is a motor, which generates a rotational movement. The motor is especially realized as a step motor. A step motor allows high precision rotational movements and can be controlled with a accuracy of some degrees.

A component carrier is provided for carrying the component, especially the image capturing unit. In general, the component carrier may comprise a plurality of separate parts. In order to facilitate the assembly of the linear actuator, it is preferred that the component carrier is formed integrally or as one-piece, for example as a casted, especially die casted part made of metal.

A gear mechanism is adapted to transmit the rotational movement. Especially, the gear mechanism is part of a drive train from the motor with the rotational movement to the component carrier with the linear motion. The gear mechanism comprises at least one gear, which is called a transfer gear. In case of a plurality of gears, the transfer gear is that gear which is adjacent to the component carrier. The expression of transfer gear is preferably functional, whereby the transfer gear is actuated by the transmitted rotational movement. In a possible embodiment, the transfer gear may have the form of a wheel. In order facilitate the assembly of the linear actuator, it is preferred that the transfer gear is formed integrally or as one-piece, for example as a molded, especially injection molded part made of plastic.

According to the invention the transfer gear comprises a guide way, especially a slide way, which is arranged, preferably formed on the transfer gear and extends in rotational direction. Preferably, the guide way is arranged on a front side of the transfer gear facing the component carrier. The guide way is sloped so that the height of the guide way in a direction parallel to a rotational axis of the transfer gear and/or in linear direction varies along the guide way. The component carrier is operatively connected to the guide way by resting means in such a way that the component carrier is displaced in the linear direction by rotating the transfer gear because of the slope of the guide way. Alternatively formulated, during rotation of the transfer gear, the resting means are moved along the guide way and are displaced by the slope of the guide way in linear direction. As the component carrier is operatively coupled with the resting means, also the component carrier is displaced in the same direction. As a result the displacement of the component carrier during a rotational movement of the transfer gear corresponds to the height difference of the slope during said rotational movement.

It is one finding of the invention that by providing the transfer gear as key element of a converter, which allows to convert a rotational movement into a linear movement, a compact and nevertheless robust linear actuator is created. The robustness leads to a trouble-free operation and to low-maintenance requirements. The compactness allows to integrate the linear actuator into a camera with limited available space.

In a preferred embodiment of the invention, the guide way is realized as at least one circular path or a section thereof. The circular path is arranged coaxial to the rotational axis of the transfer gear. In this embodiment, the resting means is moved only along one direction, i.e. in the linear direction, and is stationary in respect to a plane perpendicular to the linear direction, so that the construction can be kept simple and thus easy to manufacture.

In a preferred development of the invention, the guide way has a constant slope in the circumferential or rotational direction, so that the displacement of the component carrier in linear direction is proportional to the rotation of the transfer gear. This development allows an easy control of the linear actuator.

In a preferred realization of the invention, the resting means are embodied as one or more rest fingers or rest blocks. Especially, the resting finger or block extends only over an angle range of less than 15°, preferably less than 10°. This realization takes into account, that the larger the resting means are extended in the rotational direction the smaller is the overall rotation range of the transfer gear. So it is useful to keep the resting means as small as possible in the rotational direction. On the other hand side, a sufficient support should be provided, so that the resting finger or block extends at least over a range of 3° or 5° around the rotation axis of the transfer gear.

Preferably, the guide way extends over a sector of a circle greater-than-or-equal 60°, 90° or 110° degree. This extension secures a long guide way for the resting means. Furthermore it is preferred that the guide way comprises three sections, which corresponds to three resting fingers as resting means. Especially, the sections of the guide way and/or the resting fingers are regularly distributed in the circumferential direction. The said arrangement prevents a tilting and thus a jamming of the component carrier in the linear direction.

In order to further assist a tilt-free and thus jamming-free operation of the linear actuator the component carrier is preferably guided positively locked or form-locked by the supporting structure. The supporting structure may have a guiding groove, slot or channel which takes course in the linear direction and which guides a sliding block from the component carrier. It is especially preferred that the supporting structure comprises at least two of said guiding means preferably arranged on diametrical positions or halves in relation to the rotation axis of the transfer gear.

The component carrier is displaced in the linear direction away from the transfer gear by the slope of the guide way. In the opposite direction, the component carrier is spring biased, so that a spring component presses the component carrier against the transfer gear. With this preferred development the linear actuator is capable to displace the component carrier backwards and forwards in the linear direction.

In a preferred embodiment, the gear mechanism comprises a gear train with a plurality of (transmission) gears, whereby the absolute value of the overall transmission ration is greater than 1 and/or the gear train is a reduction gear. Consequently, the number of revolutions per minute at the motor side is larger than the number of revolutions per minute at the transfer gear side. Preferably, the transmission gears are spur gears, which may have teeth at internal or at external surfaces. Alternatively, the rotational movement is transmitted by friction gears, which have friction zones at internal or at external surfaces. The gears may be made of plastic, for example as molded, especially injection molded parts. Preferably, most or all rotation axis of the gears are aligned parallel to allow an easy setup of the linear actuator.

It is especially preferred that most of or all the gears are overlapping with the transfer gear in a projection in the linear direction to allow a small package space. The package space can especially downsized in case at least one double gear unit is used comprising two transmission gears being arranged coaxially. In a possible realization, two such double gear units are used.

It is especially preferred that the transfer gear is realized as a hollow gear or internal gear, which is coupled with the adjacent transmission gear unit or gear.

A further subject-matter of the invention is a camera, especially a surveillance camera with a back focus module with the linear actuator as described above for adjusting the position of the image capturing unit of the camera. More specifically, the linear actor changes the distance between the image capturing unit, which Is as the component coupled with the component carrier and the object lens. The camera may further comprise an interface module for communicating inside a surveillance network or with a surveillance center to transfer data, especially images or video streams or other metadata to the surveillance center or to receive messages or instructions from the surveillance center.

Further features, advantages and effects of the invention will become apparent by the description of a preferred embodiment of the invention and the figures as attached. The figures show.

Figure 1:
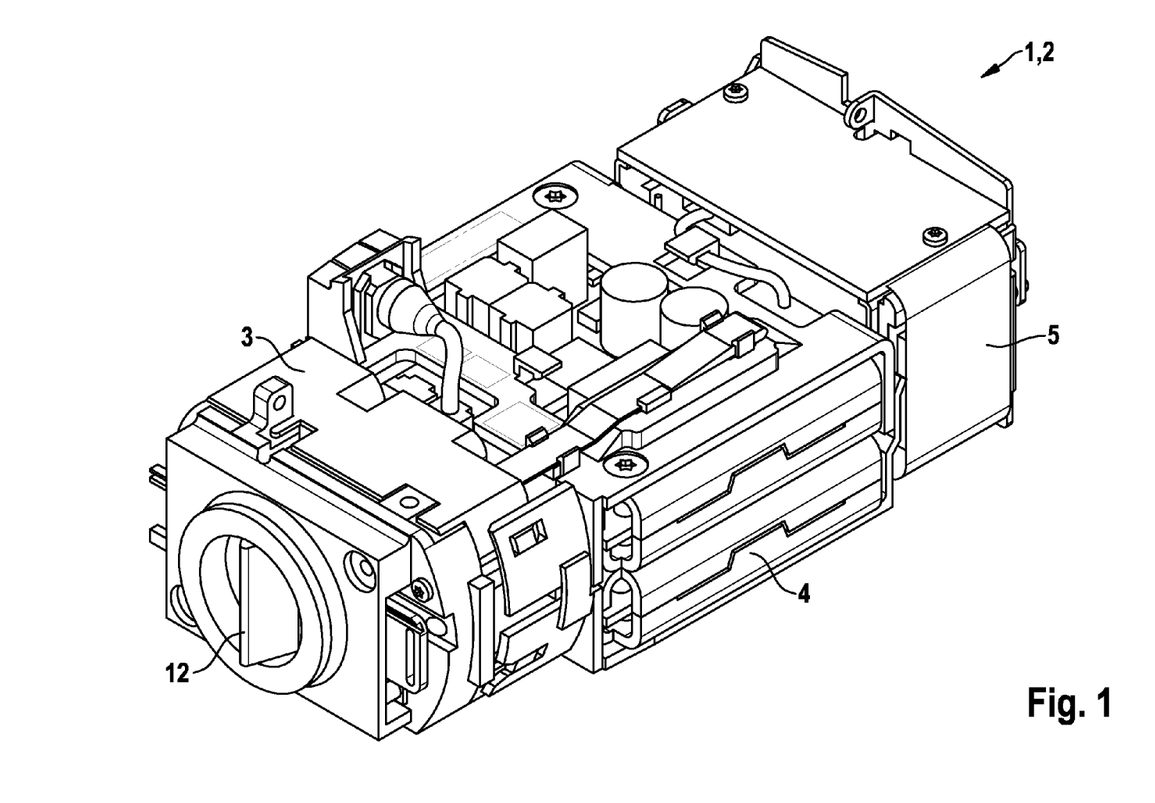
FIG. 1 an isometric view from the bottom side on an unit of a camera as an embodiment of the invention.

FIG. 1 represents a three-dimensional view of a camera 1 as an embodiment of the invention without an external housing and without object lens, so that only a unit 2 of the camera 1 is shown. The camera 1 and thus the unit 2 is a surveillance camera, for example used in a surveillance network.

The unit 2 may roughly be divided into three sub-assemblies, namely a motorized back focus adjusting module 3 for adjusting the back focus of the camera 1, an image processing module 4 including a power stack and an interface module 5.

The motorized back focus adjusting module 3 is box-shaped and has the function to adjust the back focus of the camera 1 by changing the distance between the object lens (not shown) and the image capturing unit (not shown) as discussed later. In the image processing module 4, the images captured by the image capturing unit are pre-processed, processed, compressed etc. It is also possible that the images are analyzed or object detection or object tracking is performed. The images may be realized as single images, series of images or video streams with a plurality of images. The image processing unit 4 comprises one or two printed circuit boards. The power pack provides the power for the camera 1 by converting or processing a supply voltage.

The interface module 5 provides a plurality of electric/electronic interfaces for example for the power supply for providing the supply voltage, a network interface for example for communicating with a surveillance control center and for transferring images or metadata of the images to the surveillance control center.

Figure 2:
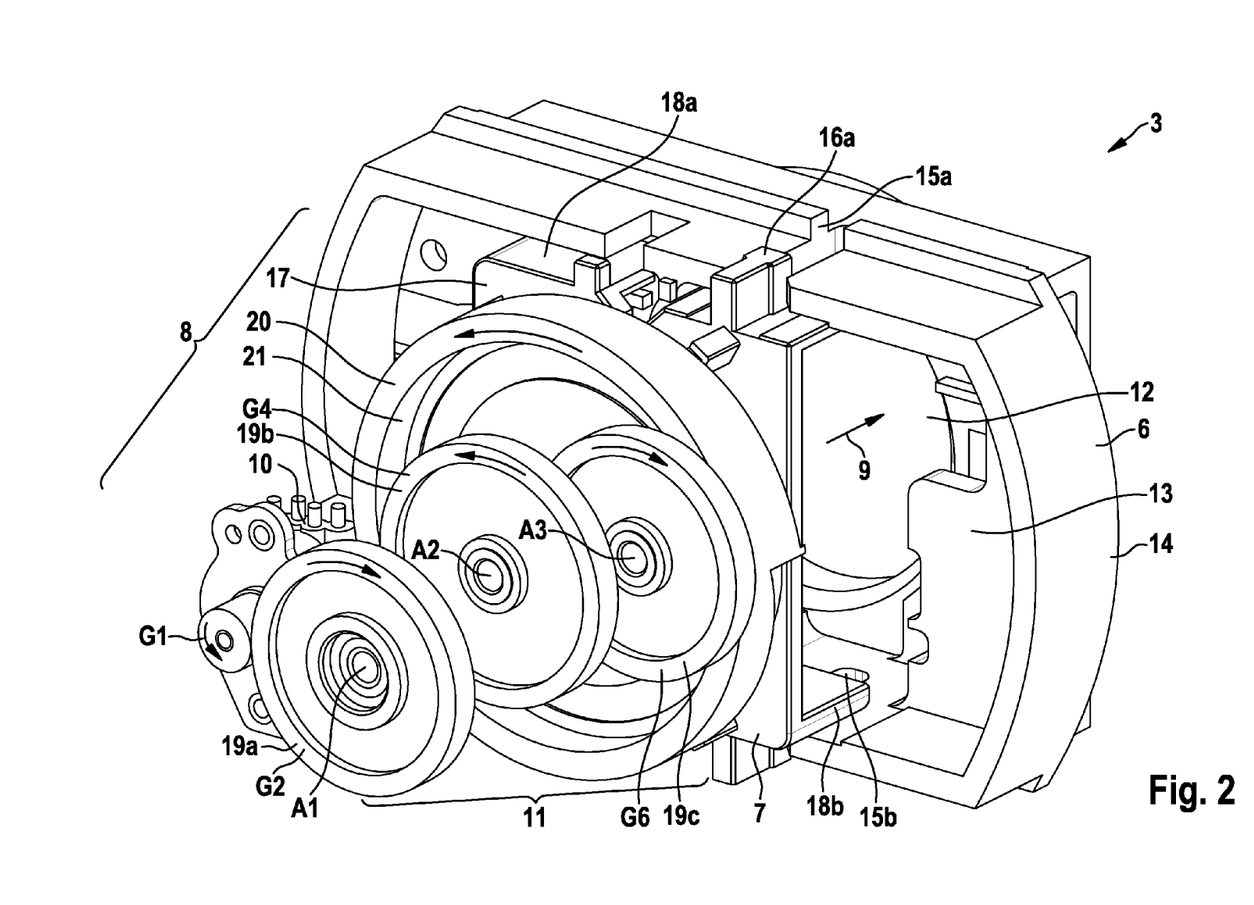
FIG. 2 an isometric view from the rear side into the back focus adjusting module of the camera in FIG. 1.
Figure 3:
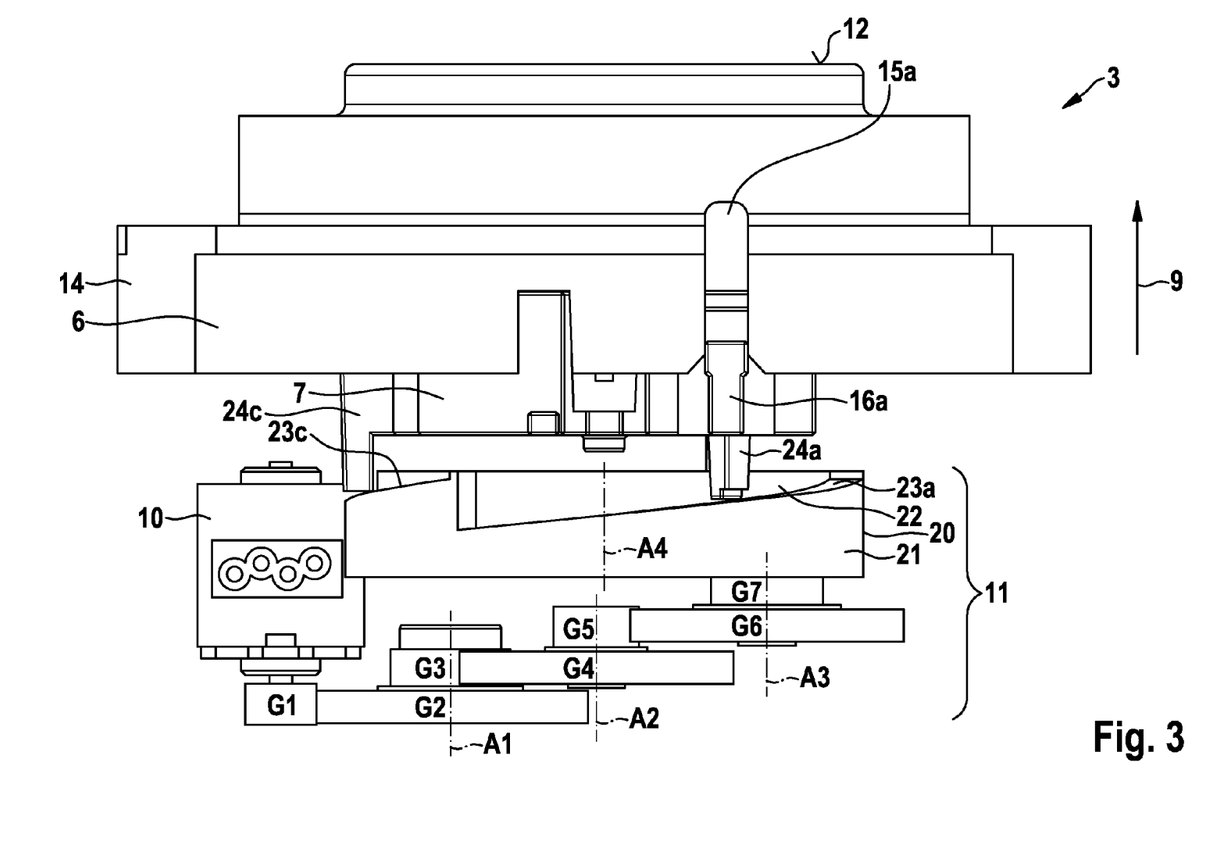
FIG. 3 a bottom view onto the back focus adjusting module in FIG. 2.

FIG. 2 illustrates the motorized back focus adjusting module 3 in a three-dimensional view from the backside, whereby some components are suppressed in the drawing. FIG. 3 illustrates the same by a top view. The motorized back focus adjusting module 3 comprises a housing 6 as a supporting structure in which a component carrier 7 as a part of a linear actuator 8 is arranged movably in a linear direction 9. The linear actuator 8 further comprises a motor 10 and a gear mechanism 11, which is adapted to convert the rotational movement of the motor 10 into the displacement of the component carrier 7 in linear direction 9.

On the component carrier 7 an image capturing unit (not shown), for example a CMOS- or CCD-chip is arranged. The housing 6 comprises a front opening 12, whereby the object lenses (not shown), the front opening 12 and the image capturing unit are aligned, so that an image is transferred by the object lens, through the front opening 12 to the image capturing device. The optical axis of the object lens is parallel or identical to the linear direction 9, so that by moving or displacing the component carrier 7 in the linear direction 9 the distance along the optical axis between the object lens and the image capturing unit is changed for the same amount and thus allows to adjust the back focus of the camera 1.

The housing 6 is made of metal, but could also be made from plastic and is for example a die casted part. It comprises a front wall 13 and circumferential side walls 14, which form an interior space in which the component carrier 7 is partly accommodated. The housing 6 shows a plurality of recesses or sections being integrally formed in the housing 6, which will be explained in the following step by step. The housing 6 comprises two guiding slots 15a, b extending in the linear direction 9 which guide two rips 16a, b integrally formed on the component carrier 7 so that the component carrier 7 is positively-locked and so that it can only be moved in the linear direction 9. The metal is used for reasons of heat-transfer function The component carrier 7 is also made of metal, but could also be made from plastic, especially die-casted and comprises a back-wall as main section 17 from which a bottom wall 18 a and a top wall 18b extends in the linear direction perpendicular to the main section 17 on which the rips 16a, b are formed, respectively. The metal is used for reasons of heat-transfer function The motor 10 is arranged on the housing 6 and transfers its rotational movement in the gear mechanism 11. The motor 10 is a step-motor with for example a full step-width of 18°. The output shaft of the motor 10 is coupled with a first gear G1.

The gear G1 is coupled with a first gear unit 19a comprising a gear G2 and a gear G3, which are rigidly coupled and have the same rotation axis A1. The external surface of the gear G1 is coupled with the external surface of the gear G2. The diameter of the gear G2 is larger than the diameter of the gear G3.

The gear G3 is coupled with a second gear unit 19b comprising a gear G4 and a gear G5, which are rigidly coupled and have the same rotation axis A2. The diameter of the gear G4 is larger than the diameter of the gear G5. The external surface of the gear G3 is coupled with the external surface of the gear G4.

The gear G5 is coupled with a third gear unit 19c comprising a gear G6 and a gear G7, which are rigidly coupled and have the same rotation axis A3. The diameter of the gear G6 is larger than the diameter of the gear G7. The external surface of the gear G5 is coupled with the external surface of the gear G6.

The gear G7 is coupled with a transfer gear 20 comprising a gear section 21 on the side facing the gears G1 . . . G7 and a guide section 22 facing the component carrier 7. The gear section 21 comprises an internal surface with a hollow gear section which is coupled with the gear G7. The transfer gear 20 rotates around a rotation axis A4.

All axis A1, A2, A3, A4 are parallel to each other and are parallel to the linear direction 9 and the optical axis. The gears G1 . . . G7 and the transfer gear 20 are spur gears and may be coupled with each other by friction or by teeth. Based on the diameters of the gears G1 . . . G7 and the transfer gear 20, the number of revolutions per minute at the motor 10 side is larger than the number of revolutions per minute at the transfer gear 20 side. The transfer gear 20 can be rotated, oscillated or swiveled by the motor 10 and the gear mechanism 8.

Figure 4:
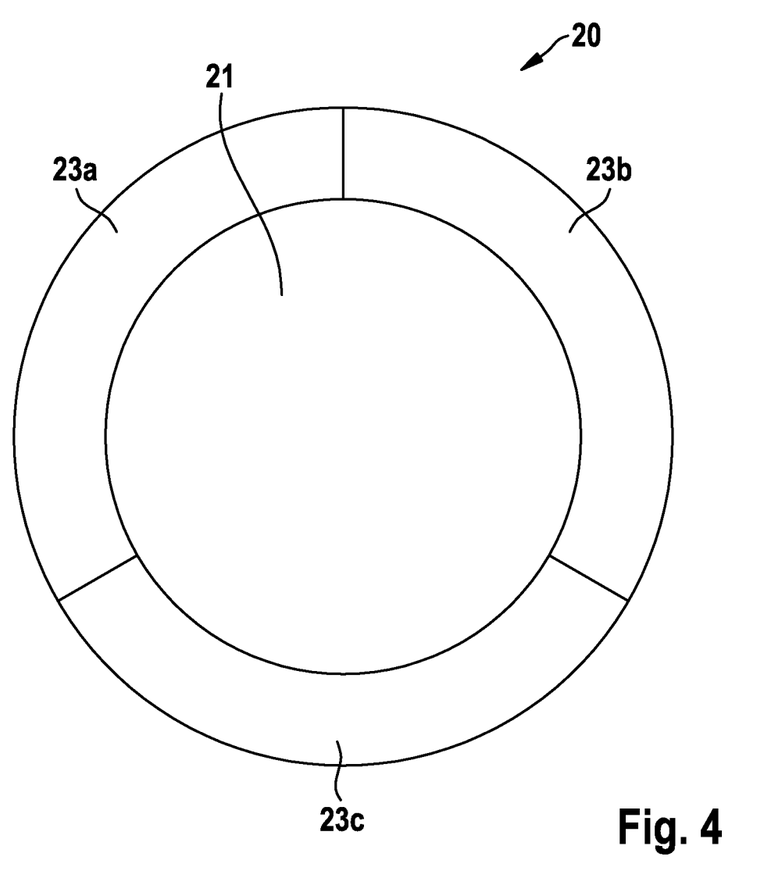
FIG. 4 a schematic front view on the transfer gear of the back focus adjusting module in the FIGS. 3 and 4.

As it can be best seen by FIG. 4, which is a schematic front view on the guide section 21 of the transfer gear 20, three guide ways 23a, b, c are formed in the transfer gear 20, whereby each guide way 23a, b, c extends in a circumferential or rotational direction. Each guide way 23a, b, c extends over an angle range of nearly 120°. The height of the transfer wheel 20—also called wedge wheel—is 7 mm.

As it can be seen in FIG. 3, the guide ways 23a, b, c are sloped in the direction of their extension. The height difference from the beginning to the end of the slope in linear direction 9 is 3 mm. All three guide ways 23a, b, c have the same constant slope. The component carrier 7 comprises three resting blocks 24a, b, c being integrally formed in the component carrier 7 and extend in opposite direction to the linear direction 9 as a resting or opposite direction, whereby each guide way 23a, b, c supports one of the resting blocks 24a, b, c.

The resting blocks 24a, b, c as resting means abut upon the guide ways 23a, b, c in the resting or opposite direction. In case the transfer gear 20 is rotated around its rotation axis A4, the resting blocks 24a, b, c slide relative to the guide ways 23a, b, c and are displaced by the slopes in the linear direction 9. As a result, the component carrier 7 is moved in the linear direction 9.

In this embodiment based on the design of the motor 10, the gear mechanism 8, the slopes of the transfer gear 20, the linear actuator 11 allows a total displacement of the component carrier 7 of 3 mm, whereby each step of 18° of the motor 10 results in a step of the component carrier 7 in linear direction 9 of 3 µm (micrometers). The combined height of the linear actuator 11 is only about 15 mm.

Figure 5:
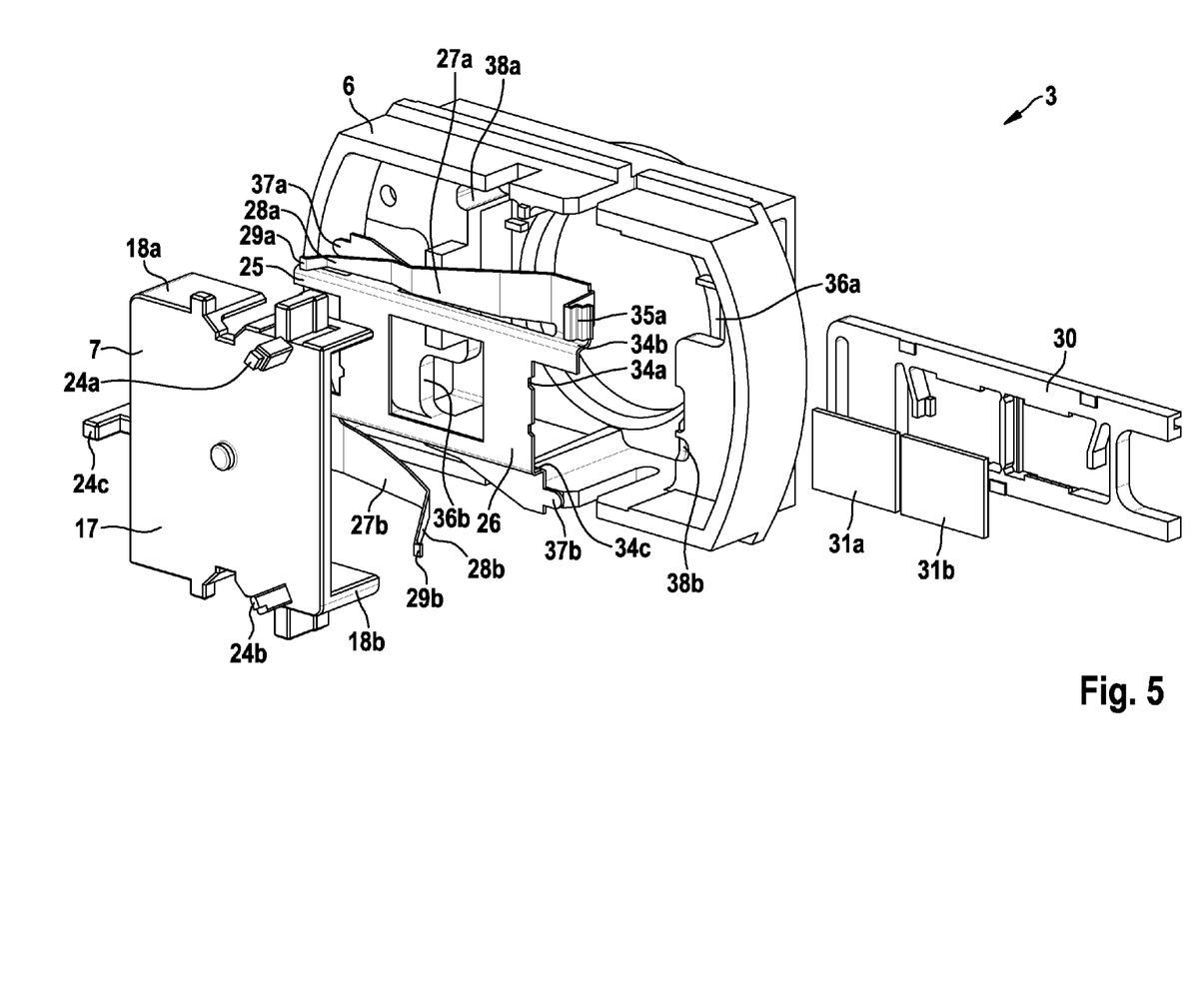
FIG. 5 an isometric, exploded view of parts of the back focus adjusting module from the previous figures.
Figure 6:
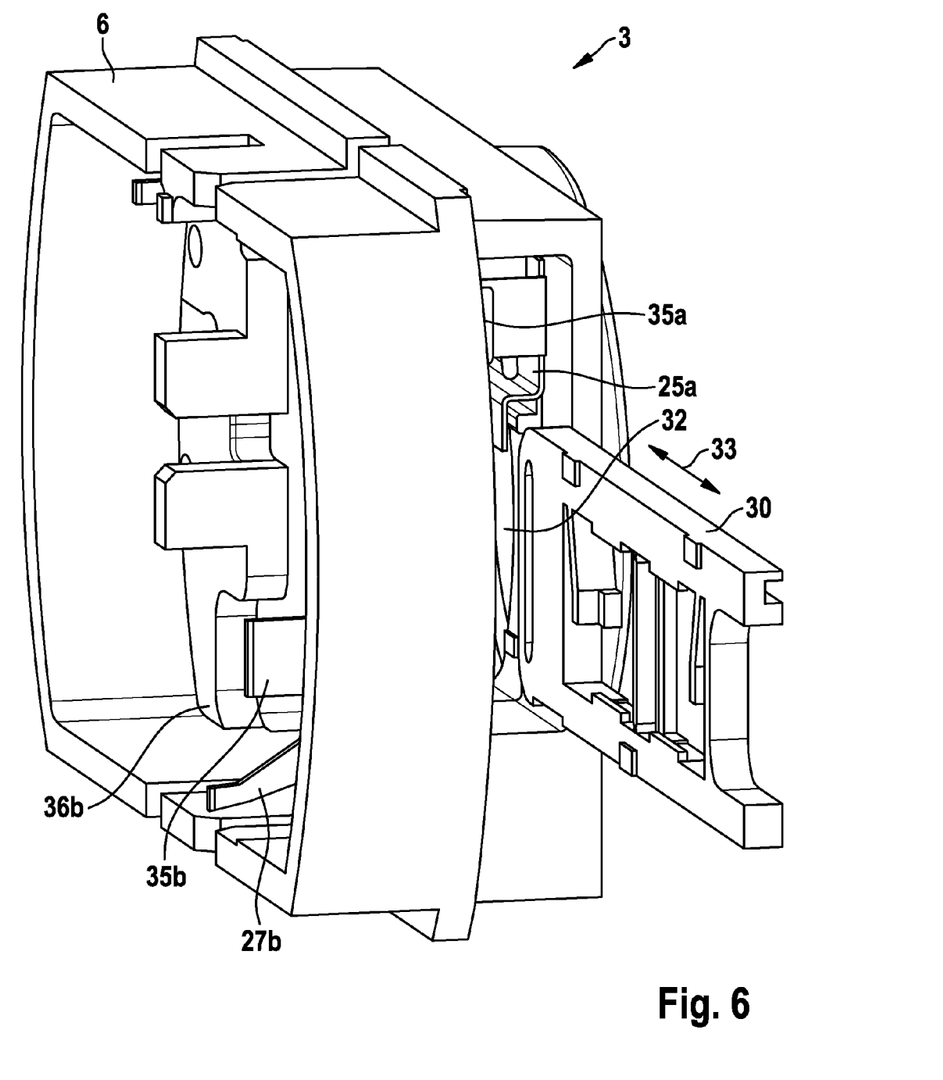
FIG. 6 a isometric view of parts of the back focus adjusting module from the previous figures.

Between the component carrier 7 and the housing 6 a spring component 25 is arranged, which is only shown in the FIGS. 5 and 6, which illustrate an exploded isometric and a non-exploded isometric view of the housing 6 with the spring component 25. The spring component 25 is a multifunctional part and comprises a guiding section 26 and spring sections 27a, b arranged on the upper and lower side of the guiding 26.

A first function of the spring component 25 is a biasing function. The linear actuator 11 is only capable to press the component carrier in the linear direction 9, but is not capable to retract the component carrier 7 in the opposite direction. The spring component 25 pre-loads the component carrier 7 in the opposite or resting direction, so in case the linear actuator 11 retracts, the component carrier 7 is actively pressed in the opposite direction. Furthermore, the spring component 25 secures that the component carrier 7 is always in contact with the transfer wheel 20 and holds the component carrier 7 at its position. Each spring section 27a, b comprises a leaf spring section 28a, b, which is for example leg- or tongue-shaped and which extends parallel to the guiding section 26 and is formed or angled in a direction towards the component carrier 7. The leaf spring sections 28a, b, press with their free ends, 29a, b against the component carrier 7, so that the component carrier 7 is preloaded in said opposite direction.

The back focus adjusting module 3 comprises a slider 30, which is a holder or a track for two optical filters 31a, b. The slider 30 can be inserted in a guiding slot 32 of the back focus adjusting module 3 in a sliding direction 33, which is perpendicular to the linear direction 9. The slider 30 can be arranged in two sliding positions, whereby in a first sliding position, the first optical filter 31a, for example an IR-filter, and in a second sliding position the second optical filter 31b, for example a dummy filter, is placed in the optical path between the object lens and the image capturing unit. The slider 30 is driven by a further motor, which is not shown in the figures.

A second function of the spring component 25 is to provide guiding surfaces for the slider 30 to support or to realize a form-locking guidance of the slider 30 in the sliding direction 33. The guiding section 26 comprises a side guiding surface 34a, a bottom guiding surface 34b and a top guiding surface 34c, which all three face the slider 30 in the sliding slot 32. The side guiding surface 34a extends parallel to the slider 30 and the sliding direction 33 and is perpendicular to the linear direction 9. The bottom and top guiding surfaces 34b, c are arranged on wing sections which extend perpendicular to the side guiding surface 34a and are bridging the guiding section 26 and spring sections 27a, b. Summarized, in a cross-section perpendicular to the sliding direction 33, the guiding section 26 provides a u-formed guiding for the slider 30. In the remaining or open area, the slider 30 is guided by a guiding surface of the housing 6, so that the guiding slot 32 is formed together by the spring component 2 and the housing 6.

A third function of the spring component 25 is a locking function, whereby the spring component 25 is locked in the housing 6. Each leaf section 27 a, b comprises a flatform spring 35a, b (or bended leaf spring), which is resilient or flexible in the linear direction 9. The flatform springs 35a, b are designed to fit into undercuts 36a, b provided as recesses in the housing 6. During assembly of the back focus adjusting module 3, the spring component 25 is inserted into the housing 6 along the linear direction 9. In the final position, the flatform springs 35a, b realized as bended fingers snap or are positioned in the undercuts 36a, b. After releasing the spring component 25, the flatform springs 35a, b are form-locking members preventing a loosing of the spring component 25 in said opposite direction.

A fourth function of the spring component 25 is a positioning function, whereby the spring component 25 is realized as a self-centering or self-positioning part. Each leaf section 27a, b comprises a positioning section 37a, b, which are accommodated by positioning recesses 38a, b integrally formed in the housing 6. The positioning recesses 38a, b are grooves, which extend in the linear direction 9. The positioning sections 37a, b and the positioning recesses 38a, b act as assembly aid, as the spring component 25 is guided to its final position, and as a form-locking mounting in the final position of the spring component 25.

The spring component 25 is made of metal and is realized as a one-piece metal sheet part and may be manufactured by cutting and bending of a metal sheet.

What is claimed is:

1. A linear actuator for a linear motion of a component of a camera, the linear actuator comprising:
   a supporting structure;
   a motor arranged on the supporting structure for generating a rotational movement,
   a component carrier for carrying a component and for performing the linear motion relative to the supporting structure; and
   a gear mechanism including a gear train with a plurality of gears for transmitting the rotational movement, whereby a last gear of the plurality of gears, before the component carrier, is a transfer gear, wherein the transfer gear is a hollow gear for coupling with a proximate gear of the plurality of gears;
   wherein the transfer gear includes a guide way extending in a rotational direction of the transfer gear with a slope along the guide way,
   whereby the component carrier is coupled with the guide way by resting means, so that the component carrier is displaced in a linear direction by a rotational movement of the transfer gear due to the slope of the guide way, and
   whereby all of the plurality of gears overlap with a projection of the transfer gear in the linear direction, excluding a first gear that is directly coupled to an output shaft of the motor.

2. The linear actuator according to claim 1, characterized in that the guide way is at least one circular path or a section thereof coaxial and concentric to a rotational axis of the transfer gear.

3. The linear actuator according to claim 1, characterized in that the guide way has a constant slope in the direction of rotation of the transfer gear.

4. The linear actuator according to claim 1, characterized in that the resting means are realized as at least one rest finger or rest block.

5. The linear actuator according to claim 1, characterized in that the at least one guide way extends over greater than or equal to 60° around the rotational axis.

6. The linear actuator according to claim 5, characterized in that the transfer guide comprises three guide ways, whereby in each third of the transfer gear one of the guide ways is formed.

7. The linear actuator according to claim 1, characterized in that the component carrier is positively guided in the linear direction by the supporting structure.

8. The linear actuator according to claim 1, characterized in that the component carrier is spring biased in the linear direction for preloading the component carrier in a direction of the transfer gear.

9. The linear actuator according to claim 1, characterized in that the gear train includes a transmission ratio with an absolute value greater than 1.

10. A camera with a back focus module, characterized by a linear actuator according to claim 1, whereby the component carrier carries an image capturing unit and whereby the linear actuator allows an adjustment of a distance between the component carrier and thus the image capturing unit and an object lens.

11. The linear actuator according to claim 1, characterized in that the at least one guide way extends over greater than or equal to 90° around the rotational axis.

12. The linear actuator according to claim 1, characterized in that the at least one guide way extends over greater than or equal to 110° around the rotational axis.

13. The linear actuator according to claim 1, wherein the transfer gear includes an internal surface with a hollow gear section such that the proximate gear is coupled with the internal surface of the hollow gear.

14. The linear actuator according to claim 1, wherein the linear actuator further comprises a spring component arranged between the component carrier and the supporting structure, wherein the spring component preloads the component carrier in a direction of the transfer gear.

15. The linear actuator according to claim 14, whereby the spring component is locked in the supporting structure.

16. The linear actuator according to claim 14, whereby the spring component is a self-positioning part.

17. A linear actuator for a linear motion of a component of a camera, the linear actuator comprising:
   a supporting structure;
   a motor arranged on the supporting structure for generating a rotational movement,
   a component carrier for carrying a component and for performing the linear motion relative to the supporting structure; and a gear mechanism including a gear train with a plurality of gears for transmitting the rotational movement, whereby a last gear of the plurality of gears, before the component carrier, is a transfer gear, wherein the transfer gear is a hollow gear for coupling with a proximate gear of the plurality of gears;

wherein the transfer gear includes a guide way extending in a rotational direction of the transfer gear with a slope along the guide way, whereby the component carrier is coupled with the guide way by resting means, so that the component carrier is displaced in a linear direction by a rotational movement of the transfer gear due to the slope of the guide way, whereby most of or all of the plurality of gears overlap with a projection of the transfer gear in the linear direction, wherein the linear actuator further comprises a spring component arranged between the component carrier and the supporting structure, wherein the spring component preloads the component carrier in a direction of the transfer gear, wherein the spring component includes a guiding section, a first spring section located on an upper side of the guiding section, and a second spring section located on a lower side of the guiding section, wherein the upper side is opposite the lower side, wherein the first spring section and the second spring section each include a leaf spring section which each extend parallel to the guiding section, and wherein the leaf spring sections of the first spring section and the second spring section press against the component carrier.

18. The linear actuator according to claim 17, wherein the linear actuator further comprises a slider, wherein the slider is a holder or a track for two optical filters, wherein the guiding section provides a U-formed guiding for the slider.

\* \* \* \* \*